United States Patent
Shultz et al.

(10) Patent No.: US 8,060,683 B2
(45) Date of Patent: Nov. 15, 2011

(54) SYSTEM, METHOD AND PROGRAM TO PRESERVE A CACHE OF A VIRTUAL MACHINE

(75) Inventors: Steven Shultz, Endicott, NY (US); Xenia Tkatschow, Jamesville, NY (US)

(73) Assignee: International Business Machines Corporation, Armonk, NY (US)

( * ) Notice: Subject to any disclaimer, the term of this patent is extended or adjusted under 35 U.S.C. 154(b) by 1681 days.

(21) Appl. No.: 11/015,167

(22) Filed: Dec. 17, 2004

(65) Prior Publication Data

US 2006/0136667 A1 Jun. 22, 2006

(51) Int. Cl.
*G06F 12/16* (2006.01)

(52) U.S. Cl. ........... 711/6; 711/118; 711/E12.002; 711/E12.103; 718/1; 718/104

(58) Field of Classification Search ......... 711/6, 118; 718/1, 104
See application file for complete search history.

(56) References Cited

U.S. PATENT DOCUMENTS

| | | | |
|---|---|---|---|
| 5,148,540 A | 9/1992 | Beardsley et al. | 395/575 |
| 5,437,033 A * | 7/1995 | Inoue et al. | 714/10 |
| 5,459,857 A | 10/1995 | Ludlam et al. | 395/182.04 |
| 6,075,938 A * | 6/2000 | Bugnion et al. | 703/27 |
| 6,151,607 A * | 11/2000 | Lomet | 707/202 |
| 6,430,564 B1 * | 8/2002 | Judge et al. | 707/100 |
| 6,587,937 B1 * | 7/2003 | Jensen et al. | 711/173 |
| 6,785,786 B1 | 8/2004 | Gold et al. | 711/162 |
| 2002/0016812 A1 * | 2/2002 | Uchishiba et al. | 709/104 |
| 2002/0112134 A1 | 8/2002 | Ohran et al. | 711/162 |
| 2004/0078631 A1 | 4/2004 | Rogers et al. | 714/5 |
| 2004/0210793 A1 | 10/2004 | Chokshi et al. | 714/5 |

\* cited by examiner

*Primary Examiner* — Pierre-Michel Bataille
*Assistant Examiner* — Ralph A Verderamo, III
(74) *Attorney, Agent, or Firm* — Dennis Jung

(57) ABSTRACT

A system, computer program product and method for managing a cache of a virtual machine. A cache is defined in memory, and a virtual machine is assigned to the cache. An identity of the cache is recorded in storage. The virtual machine terminates, and the cache and contents of the cache are preserved despite the termination of the virtual machine, such that if the virtual machine subsequently resumes operating, the virtual machine can access the cache and its contents. There is also a system, method and computer program product for managing a cache of an LPAR. A cache is defined in memory, and assigned to an LPAR. A record is made of an identity of the cache in storage. The LPAR terminates, and the cache and contents of the cache are preserved despite the termination of the LPAR, such that if the LPAR subsequently resumes operating, the LPAR can access the cache and its contents.

10 Claims, 13 Drawing Sheets

FIG. 3

288 — CACHE KEEP-ALIVE VIRTUAL MACHINE UPON BOOT UP AND PERIODICALLY THEREAFTER ACCESSES STORAGE TO IDENTIFY CACHES WITHIN LPAR

290 — CACHE KEEP-ALIVE VIRTUAL MACHINE REQUESTS ATTACHMENT TO NEW CACHE

292 — HYPERVISOR NOTIFIES CACHE KEEP-ALIVE VIRTUAL MACHINE OF VIRTUAL ADDRESS OF CACHE

294 — HYPERVISOR UPDATES CACHE USER TABLE TO INDICATE TWO USERS

296 — IF CACHE KEEP-ALIVE VIRTUAL MACHINE TERMINATES NORMALLY OR ABNORMALLY, THEN HYPERVISOR DECREMENTS CACHE USER TABLE FOR EACH CACHE FOR WHICH CACHE KEEP-ALIVE VIRTUAL MACHINE WAS "ATTACHED"

298 — IF THERE ARE NO REMAINING ACTIVE USERS OF A CACHE, THEN HYPERVISOR DELETES THE CACHE

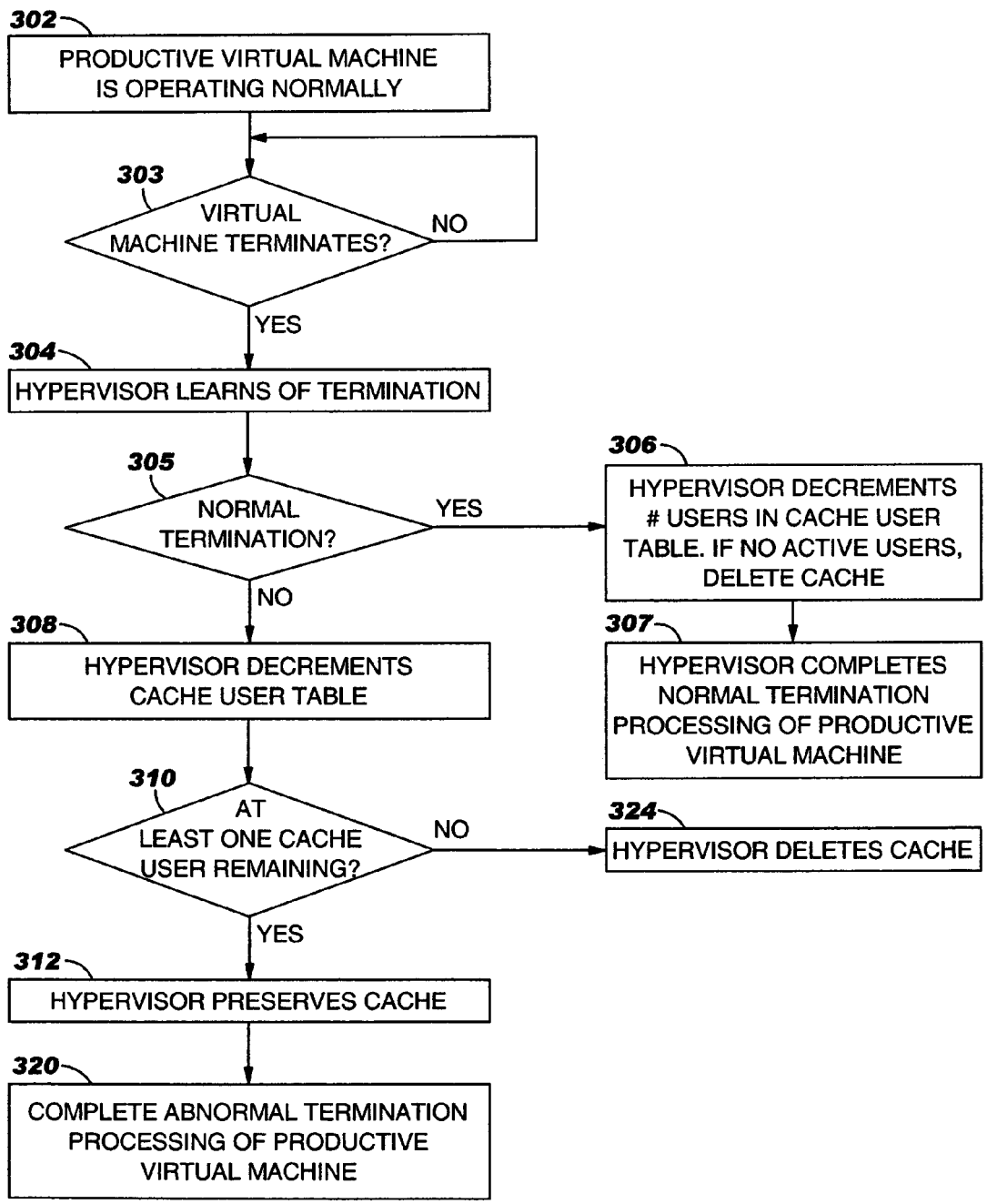

FIG. 11

1188 — CACHE KEEP-ALIVE LPAR UPON BOOT UP AND PERIODICALLY THEREAFTER ACCESSES STORAGE TO IDENTIFY CACHES WITHIN SYSTEM

1190 — CACHE KEEP-ALIVE LPAR REQUESTS ATTACHMENT TO NEW CACHE

1192 — LOGICAL PARTITIONING PROGRAM NOTIFIES CACHE KEEP-ALIVE LPAR OF VIRTUAL ADDRESS OF CACHE

1194 — LOGICAL PARTITIONING PROGRAM UPDATES CACHE USER TABLE TO INDICATE TWO USERS

1196 — IF CACHE KEEP-ALIVE LPAR TERMINATES NORMALLY OR ABNORMALLY, THEN LOGICAL PARTITIONING PROGRAM DECREMENTS CACHE USER TABLE FOR EACH CACHE FOR WHICH CACHE KEEP-ALIVE LPAR WAS "ATTACHED"

1198 — IF THERE ARE NO REMAINING ACTIVE USERS OF A CACHE, THEN LOGICAL PARTITIONING PROGRAM DELETES THE CACHE

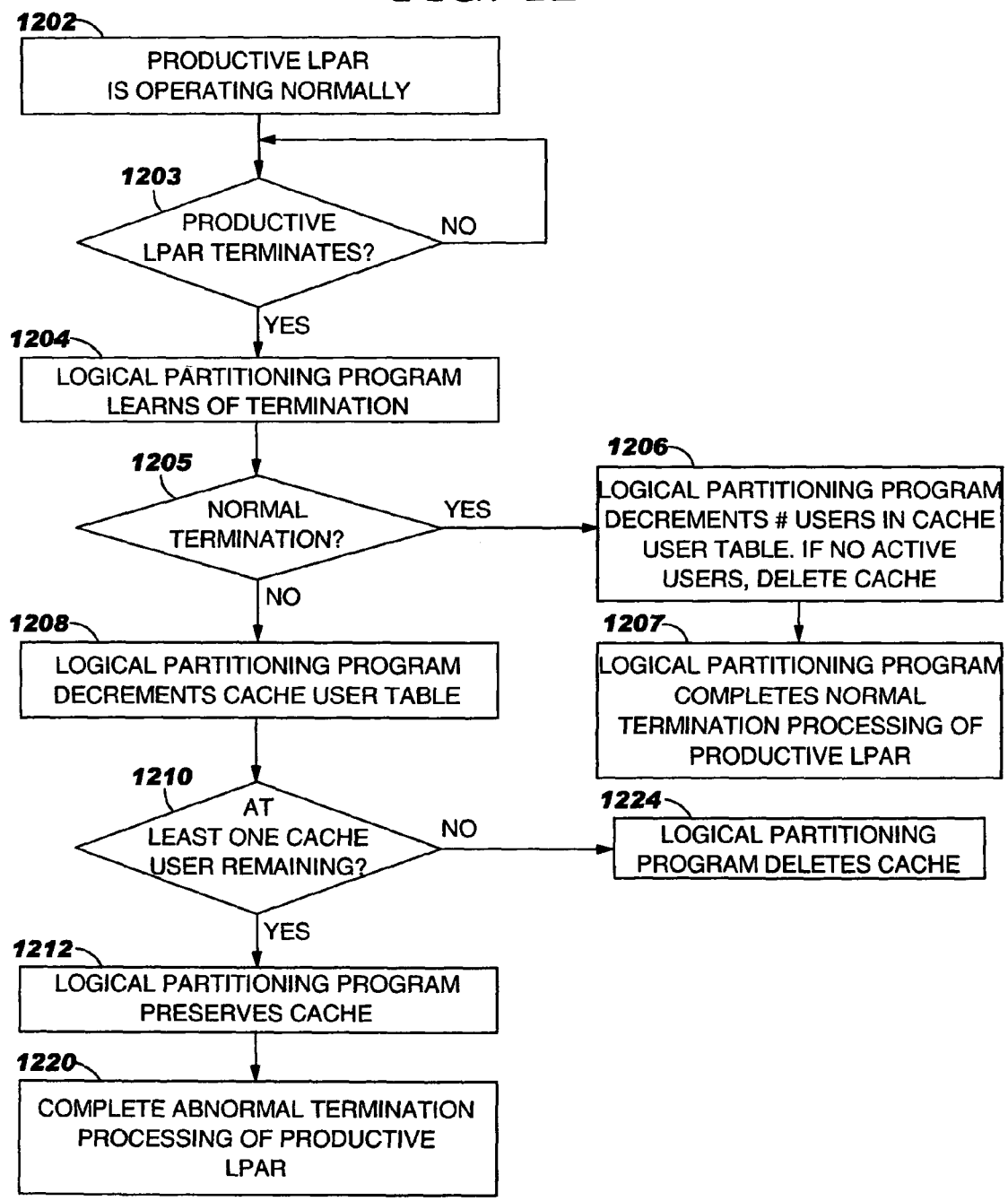

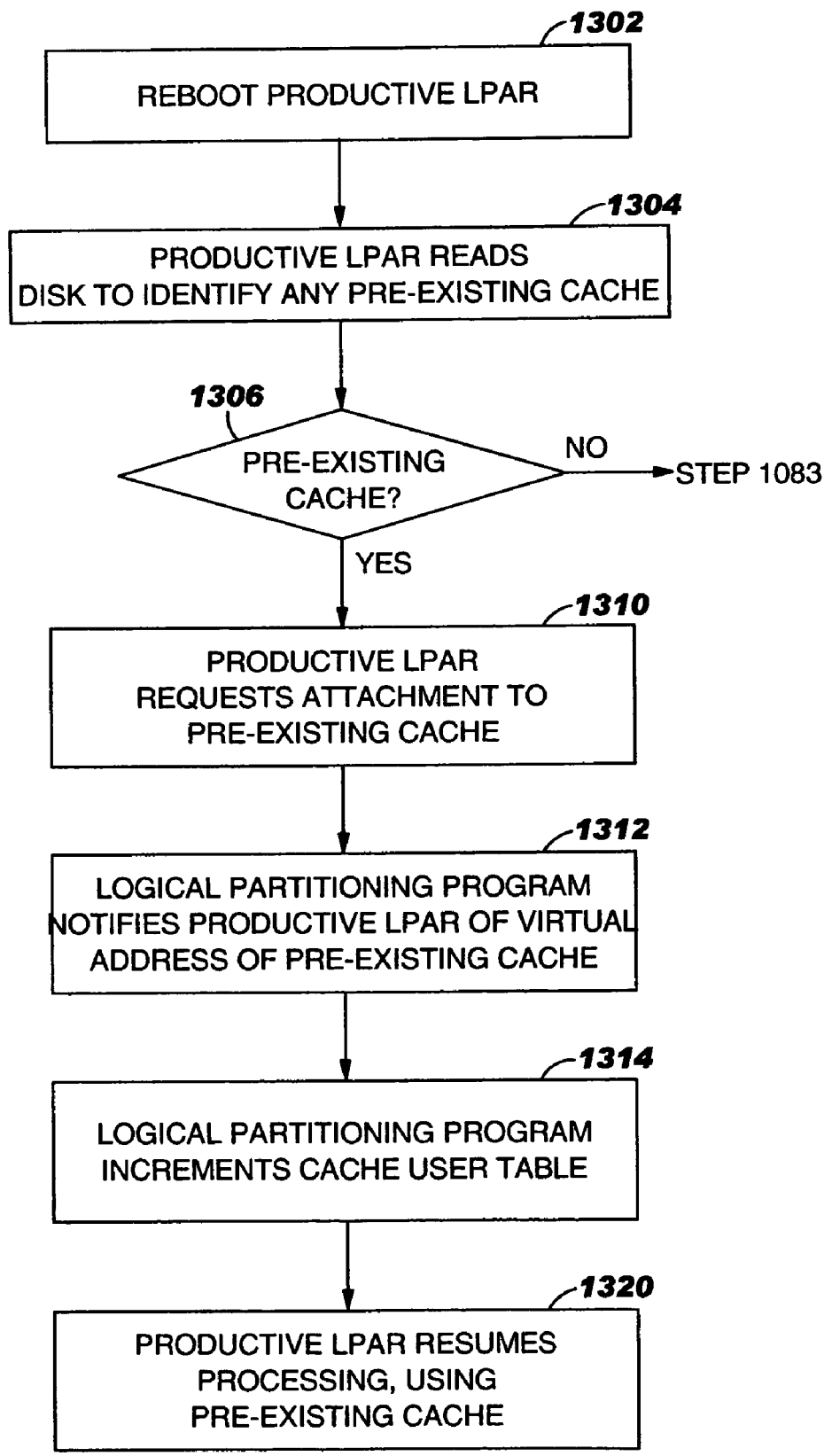

SYSTEM, METHOD AND PROGRAM TO PRESERVE A CACHE OF A VIRTUAL MACHINE

FIELD OF THE INVENTION

The invention relates generally to computer systems, and deals more particularly with preserving contents of a cache of a virtual machine.

BACKGROUND OF THE INVENTION

Computers configured as virtual machines are well known today. In this configuration, a hypervisor program logically divides physical resources of a real computer into separate virtual machines. A virtual machine is a virtual sharing of computer resources such as processor(s), memory, storage and I/O (i.e. network cards, printers and displays.) A guest operating system executes/runs on each virtual machine. One or more applications and middleware programs (such as a file manager) run on each guest operating system. Even though each application, middleware program and guest operating system are executing in a virtual machine, they operate as if they are running on their own private, real computer. In a known IBM z/VM operating system, the hypervisor program is called the Control Program ("CP"), and each virtual machine may be called a "virtual machine", a "user portion" or a "guest". It was also known for a logical partitioning program to logically divide the physical resources of a real computer into logical partitions ("LPARs"), and then for the hypervisor to logically divide each LPAR into virtual machines. In a known IBM zSeries computer, a known IBM Processor Resource/Resource Manager ("PR/SM") program logically partitions a real computer.

The known division of a real computer into virtual machines is further described as follows. The hypervisor allocates to each virtual machine a time share of one or more real processors. The hypervisor also allocates to each virtual machine a range of (virtual) private memory ("VPM") mapped to RAM. When a virtual machine addresses its own (virtual) private memory, the hypervisor translates the virtual memory address into a real address of real memory. The hypervisor also allocates memory to itself to store its own control structures.

The guest operating system in each virtual machine can be the Linux (™ of Linus Torvalds) operating system, IBM CMS operating system or other operating systems. The applications that execute on each guest operating system on each virtual machine can be an IBM DB2 data base management application, IBM Websphere application, or other applications.

The guest operating system and application(s) for each virtual machine are stored in the private memory allocated to the virtual machine. Each virtual machine also includes a cache in the virtual machine's private memory. The cache contains data recently accessed from (disk) storage via a file system by the application or middleware, and associated metadata. The metadata comprises a directory and sub directory path to the file, identities of records within the file currently being written or read, size of the file, size of records in the file, type (ASCII, EBCDIC or BINARY) of data in the file, where the file is stored on disk, etc.

As explained above, it is also known for a logical partitioning program to logically divide a single real computer into multiple logical partitions ("LPARs"), and then for a hypervisor to logically divide each logical partition into separate virtual machines. In other words, the logical partitioning program logically divides and virtualizes the computer resources (including the share of processor(s) and memory) to form each LPAR, and then the hypervisor further divides the logical share of computer resources of each LPAR to form the resource platform for each of the virtual machines. Typically, an administrator assists in defining each logical partition ("LPAR") by specifying to the logical partitioning program the amount of processors, memory and storage for each LPAR. Each LPAR could be allocated specific real computer resources or a share of the total computer resources. In some computers, a separate hypervisor was loaded into each LPAR to form multiple virtual machines in each logical partition. The virtual machines in each LPAR operate in the same manner as if they were formed directly from the real computer.

An existing IBM z/VM version 4.2.0 or 4.3.0 virtual machine operating system includes a known hypervisor program with capability to form each of the virtual machines from LPARs or real computers. The details of the existing z/VM 4.2.0 operating system are disclosed in IBM publication "z/VM 4.2.0 General Information" (Document Number: GC24-5991-03) which is available from International Business Machines Corp. at PO Box 29570, IBM Publications, Raleigh, N.C. 27626-0570 or on the WWW at www.IBM.com/shop/publications/order. This publication is hereby incorporated by reference as part of the present disclosure.

File manager programs, such as IBM DB/2 program, are also known. A file manager program may be considered "middleware". An application in a virtual machine can make a request to a file manager for a file, and the file manager accesses the file from storage for the application. The file manager may create a cache in memory to store pages of file needed by the application, and retain those pages according to a most recently used algorithm.

Occasionally, a virtual machine terminates. The termination may be "on purpose" when requested by a user of the virtual machine or by an administrator of the real computer. This purposeful termination is typically implemented as a standard "log off". The termination may also be accidental due to a failure of the virtual machine, guest operating system, hypervisor or real computer. When the virtual machine terminates due to a failure of the virtual machine or guest operating system or due to log off of the virtual machine, the known hypervisor automatically deletes the contents of the private memory (including the cache) of the virtual machine.

It was known for the guest operating system in each virtual machine to periodically "journal" or copying contents of its cache to nonvolatile disk. So, if the virtual machine terminates due to a failure of the virtual machine, guest operating system, hypervisor or real computer, the recently accessed data and metadata will be preserved. Consequently, when the virtual machine is restarted, the contents of the cache will be available from storage to resume processing. However, the periodic journaling/copying of data to storage is slow compared to other virtual machine operations, because of the nature of storage. This slows operation of the virtual machine.

An object of the present invention is to preserve contents of a cache of a virtual machine when the virtual machine terminates due to a failure of the virtual machine or its guest operating system.

A more specific object of the present invention is to preserve contents of a cache of a virtual machine without slowing operation of the virtual machine.

SUMMARY OF THE INVENTION

The invention resides in a system, computer program product and method for managing a cache of a virtual machine. A cache is defined in memory, and a virtual machine is assigned to the cache. An identity of the cache is recorded in storage. The virtual machine terminates, and the cache and contents of the cache are preserved despite the termination of the virtual machine, such that if the virtual machine subsequently resumes operating, the virtual machine can access the cache and its contents.

According to another feature of the present invention, a second virtual machine on a same real computer as the first virtual machine is defined. A record is made that both the first and second virtual machines are users of the cache, such that when the first virtual machine terminates, there is still one operational user recorded for the cache. The preservation of the cache and its contents when the first virtual machine terminates is based on the record of the one operational user for the cache.

According to another feature of the present invention, the virtual machine requests an attachment to the cache, and in response, a record is made that the virtual machine is a user of the cache. A second virtual machine requests an attachment to the cache, and in response, a record is made that the second virtual machine is another user of the cache.

According to another feature of the present invention, the virtual machine makes a request to a hypervisor of the virtual machine to attach to the cache and preserve the cache in case the virtual machine terminates. In response, the hypervisor defines a table which correlates to the cache virtual addresses used by the virtual machine for the cache. The table survives termination of the virtual machine, whereby the cache is preserved in case of termination of the virtual machine.

According to another feature of the present invention, another virtual machine on a same real computer as the first virtual machine makes a request to the hypervisor to attach to another cache but not preserve the other cache in case the other virtual machine terminates. In response, the hypervisor defines another table which correlates to the other cache virtual addresses used by the other virtual machine for the other cache. The other table is deleted upon termination of the other virtual machine, whereby the other cache is deleted in case of termination of the other virtual machine.

According to another feature of the present invention, the virtual machine makes a request to a hypervisor of the virtual machine to attach to the cache and preserve the cache in case the virtual machine terminates. In response, the hypervisor makes a record that the cache should be preserved in case of termination of the virtual machine. When the virtual machine terminates, the hypervisor preserves the cache and contents of the cache, such that if the virtual machine resumes operation, the virtual machine can access the cache and its contents.

According to another feature of the present invention, the virtual machine resumes operation, and access by the virtual machine to the cache and its contents is restored.

According to another embodiment of the present invention, there is a system, method and computer program product for managing a cache of an LPAR. A cache is defined in memory, and assigned to an LPAR. A record is made of an identity of the cache in storage. The LPAR terminates, and the cache and contents of the cache are preserved despite the termination of the LPAR, such that if the LPAR subsequently resumes operating, the LPAR can access the cache and its contents.

BRIEF DESCRIPTION OF THE FIGURES

FIG. 3 is a flow chart of processing by a cache keep-alive virtual machine and a hypervisor within the computer system of FIG. 1.

FIG. 4 is a flow chart illustrating processing by the productive virtual machine and hypervisor of FIG. 2 during termination of the virtual machine.

FIG. 11 is a flow chart of processing by a cache keep-alive virtual LPAR and a logical partitioning program within the computer system of FIG. 9.

FIG. 12 is a flow chart illustrating processing by the productive LPAR and logical partitioning program of FIG. 10 during termination of the virtual machine.

FIG. 13 is a flow chart illustrating processing by the productive LPAR and logical partitioning program of FIG. 10 during rebooting of the virtual machine.

DETAILED DESCRIPTION OF THE PREFERRED EMBODIMENTS

Figure 1:
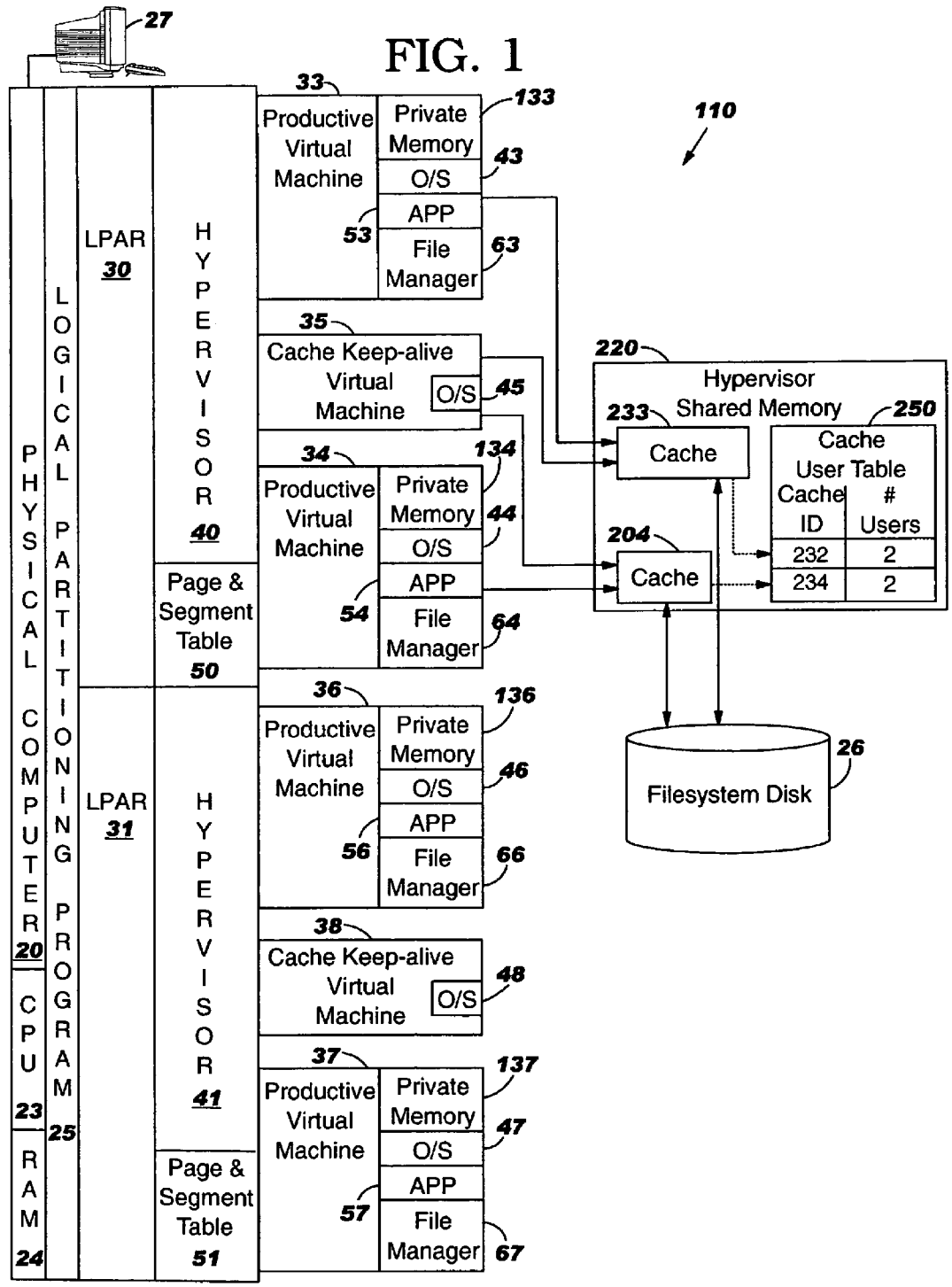
FIG. 1 is a block diagram of a real computer with two logical partitions, multiple virtual machines in each logical partition, and a hypervisor in each logical partition, according to one embodiment of the present invention.

The present invention will now be described in detail with reference to the figures, wherein like reference numbers indicate like elements throughout. FIG. 1 illustrates a computer system generally designated 110 in accordance with one embodiment of the present invention. Computer system 110 comprises a real/physical computer 20. Computer 20 includes a CPU 23, RAM 24, logical partitioning program 25, and operator console 27. Computer system 110 also includes external (disk) storage 26, local or remote. By way of example, real computer 20 can be an IBM zSeries server although the present invention can be implemented in other server computers or personal computers as well. In the embodiment illustrated in FIG. 1, logical partitioning program 25 is a known IBM Processor Resource/Resource Manager ("PR/SM") program, and divides real computer 20 into logical partitions ("LPARs") 30 and 31, although program 25 could divide computer 20 into more logical partitions if desired. Other known logical partitioning programs can also be used. An LPAR is a real or logical partitioning of the real computer resources of computer 20. For example, if computer 20 includes eight processors, program 25 can allocate four real processors to LPAR 30 and the other four real processors to LPAR 31, or program 25 can time share all eight processors between LPARs 30 and 31. Program 25 also divides the total memory 24 between LPAR 30 and LPAR 31, typically as "virtual" memory. The "virtual" memory allocations are based on allocations of virtual memory address ranges to each LPAR, irrespective of the physical location in real memory 24. Program 25, by address translation tables, translates the virtual addresses used by each LPAR to the real memory addresses where the actual data is stored. The virtual machines in both of the LPARs access storage 26 by virtual addresses furnished to the respective hypervisors. The present invention can also be embodied in a real computer that includes virtual machines and a hypervisor, but is not divided into separate LPARs.

Hypervisor programs 40 and 41 execute on LPARs 30 and 31, respectively. Hypervisor 40 divides LPAR 30 into virtual machines 33, 34 and 35 (as well as other virtual machines not shown). In other words, hypervisor 40 logically divides and virtualizes the computer resources (including the share of processor(s) 23 and memory 24) of LPAR 30 to form the resource platform for each of the virtual machines 33, 34 and 35. Hypervisor 40 allocates to each virtual machine 33, 34 and 35 a time share of the real processor(s) 23 allocated to LPAR 30. Hypervisor 40 allocates to each virtual machine 33, 34 and 35 a range of (virtual) private memory ("VPM") mapped to RAM 24, for example, virtual private memory 133 for virtual machine 33 and virtual private memory 134 for virtual machine 34. When a virtual machine 33 or 34 addresses its (virtual) private memory, the hypervisor 40 translates the virtual memory address into a real address of real memory 24. Virtual machines 33 and 34 are "productive" virtual machines in that they execute productive applications such as web applications or database applications. As explained in more detail below, the function of "cache keep-alive" virtual machine 35 is to ensure that the caches allocated to virtual machines 33 and 34 survive if virtual machines 33 and 34 terminate abnormally.

For each virtual machine in LPAR 30, a guest operating system, application(s) and middleware (such as a file manager) execute on the (virtual) processor(s) allocated to the virtual machine. Guest operating systems 43, 44 and 45 execute on virtual machines 33, 34 and 35, respectively, and applications 53 and 54 and middleware 63 and 64 execute on guest operating systems 43 and 44, respectively. However, there may be multiple applications executing on each guest operating system. By way of example, the guest operating systems can be the Linux (™ of Linus Torvalds) operating system or IBM CMS operating system. Other guest operating systems are also feasible such as Microsoft Windows™ operating system, Unix™ operating system, Sun Microsystems Solaris™ operating system or Hewlett Packard HP UX operating system. By way of example, applications 53 and 54 can be IBM DB2 data base management application, IBM Websphere application, or other application. The nature of applications 53 and 54 form no part of the present invention, except that they utilize a cache memory for data and metadata. The guest operating system and application(s) for each virtual machine in LPAR 30 are stored in the respective private memory allocated to the virtual machine.

In the illustrated embodiment, the caches of virtual machines 33 and 34 are stored in memory 220 allocated to hypervisor 40. The cache 233 for virtual machine 33 is accessible by virtual machine 33, virtual machine 35 and hypervisor 40, although in practice cache keep-alive virtual machine 35 does not need to access cache 233. Likewise, the cache 234 for virtual machine 34 is accessible by virtual machine 34, virtual machine 35 and hypervisor 40, although in practice cache keep-alive virtual machine 35 does not need to access cache 234.

Hypervisor 41 divides LPAR 31 into virtual machines 36, 37 and 38 (as well as other virtual machines not shown). In other words, hypervisor 41 logically divides and virtualizes the computer resources (including the share of processor(s) 23 and memory 24) of the LPAR 31 to form the resource platform for each of the virtual machines 36, 37 and 38. Hypervisor 41 allocates to each of the virtual machines 36, 37 and 38 a time share of real processor(s) 23 allocated to LPAR 31. Hypervisor 41 also allocates to each virtual machine 36, 37 and 38 a range of (virtual) private memory ("VPM") mapped to RAM 24 from LPAR 31, for example, virtual private memory 136 for virtual machine 36 and virtual private memory 137 for virtual machine 37. When a virtual machine 36 or 37 addresses its (virtual) private memory, the hypervisor 41 translates the virtual memory address into a real address of real memory 24. Virtual machines 36 and 37 are "productive" virtual machines in that they execute productive applications such as web applications or database applications. As explained in more detail below, the function of "cache keep-alive" virtual machine 38 is to ensure that the caches allocated to virtual machines 36 and 37 survive if virtual machines 36 and 37 terminate abnormally.

For each virtual machine in LPAR 31, a guest operating system and application(s) execute on the (virtual) processor(s) allocated to the virtual machine. Guest operating systems 46, 47 and 48 execute on virtual machines 36, 37 and 38, respectively, and applications 56 and 57 and middleware 66 and 67 (such as file managers) execute on guest operating systems 46 and 47, respectively. However, there may be multiple applications executing on each guest operating system. By way of example, the guest operating systems can be the Linux (™ of Linus Torvalds) operating system or IBM CMS operating system. Other guest operating systems are also feasible such as Microsoft Windows™ operating system, Unix™ operating system, Sun Microsystems Solaris™ operating system or Hewlett Packard HP UX operating system. By way of example, applications 56 and 57 can be IBM DB2 data base management application, IBM Websphere application, or other application. The nature of applications 56 and 57 form no part of the present invention, except that they utilize a cache memory for data and metadata. The guest operating system and application(s) for each virtual machine in LPAR 31 are stored in the respective private memory allocated to the virtual machine.

In the illustrated embodiment, the caches of virtual machines 36 and 37 are stored in memory allocated to hypervisor 41. The cache of virtual machine 36 is accessible by virtual machine 36, virtual machine 38 and hypervisor 41, although in practice virtual machine 38 does not need to access this cache. Likewise, the cache for virtual machine 37 is accessible by virtual machine 37, virtual machine 38 and hypervisor 41, although in practice virtual machine 38 does not need to access this cache.

Each productive virtual machine has its own cache which stores its own data and metadata, obtained from storage 26. The cached data is typically the recently referenced data (or "pages") of a file. The metadata may comprise a directory and sub directory path to the file, identities of records within the file currently being written or read, size of the file, size of records in the file, type (ASCII, EBCDIC or BINARY) of data in the file, where the file is stored on disk, etc. In accordance with the present invention, the cache of each productive virtual machine 33 and 34 is stored in a memory region which is not accessible by the other productive virtual machines (in the same or different LPAR), but can be accessed by hypervisor 40 for the virtual machine. In the illustrated example, virtual machine 33 has a cache 233 which is not accessible by virtual machines 34, 36 and 37, but is accessible by hypervisor 40.

Figure 2:
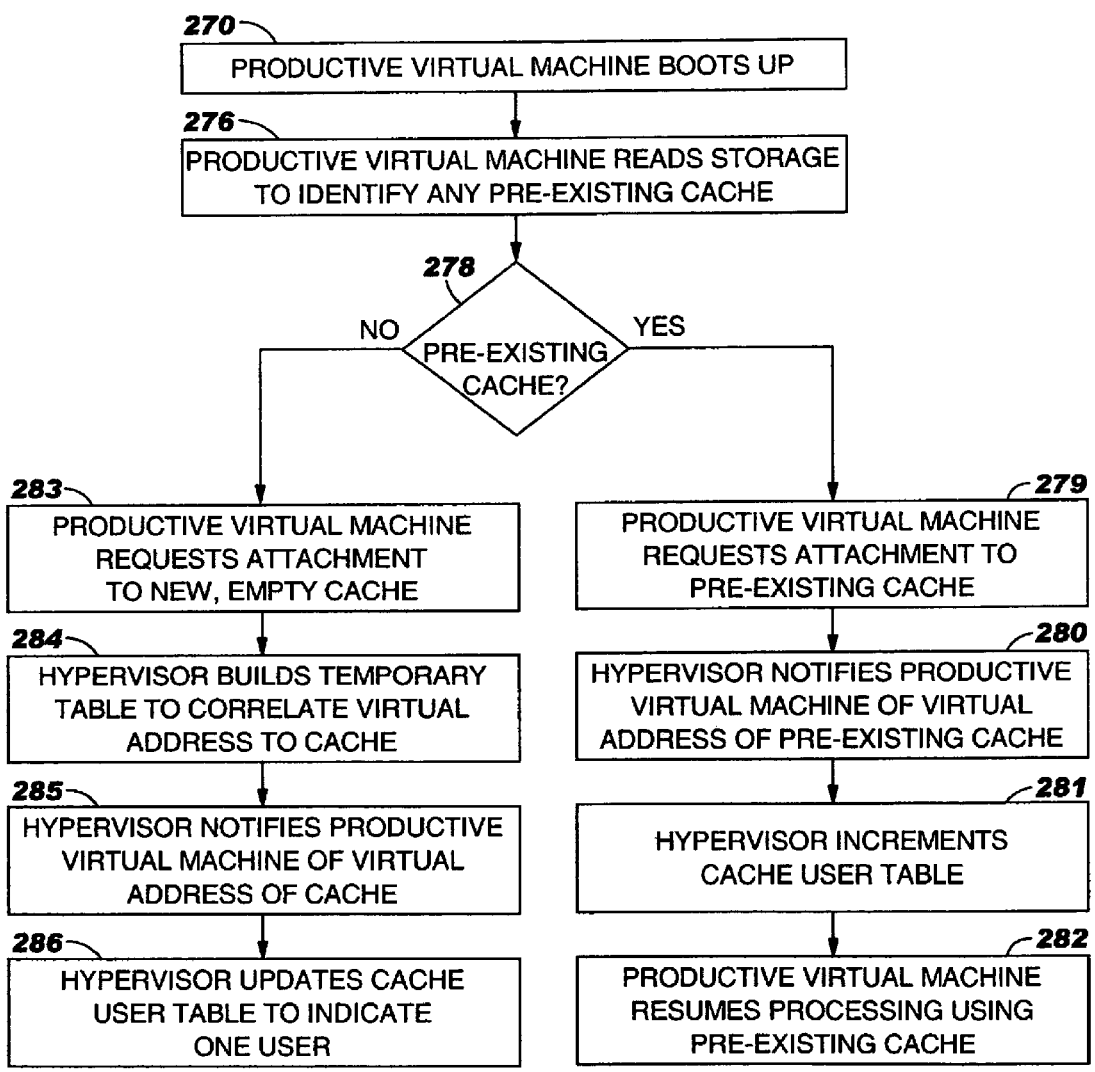
FIG. 2 is a flow chart of processing by a productive virtual machine and a hypervisor within the computer system of FIG. 1, during initialization and set up of the virtual machine.

FIG. 2 illustrates initialization and setup of each productive virtual machine. When virtual machine 33 begins operation (step 270 of FIG. 2), it reads storage 26 to determine if a cache already exists for the virtual machine (step 276 of FIG. 2). If there is no preexisting cache (decision 278, no branch), then the virtual machine 33 requests to attach to a new, empty, cache (step 283). In response, hypervisor 40 builds a temporary "page and segment" or other such table 50 to address the new cache, i.e. correlate a virtual address of the cache to be supplied by the virtual machine to the corresponding real address/segment of memory where the cache resides (step 284). Then, hypervisor 40 notifies virtual machine 33 of the virtual address to use to access the new cache (step 285). This permits virtual machine 33 to access (i.e. read from and write to) the new cache 233 by appropriate virtual address. Because the page and segment table for this cache is temporary, the hypervisor 40 is programmed to delete the cache whenever there are no (active) users of the cache. Hypervisor 40 also records in a cache user table 250 that there is currently one virtual machine user of cache 233 (step 286).

Refer again to decision 278, yes branch, where there was a preexisting cache. In such a case, virtual machine 33 makes a request to hypervisor 40 to "attach" to this cache (step 279). In this case, the request includes the identity of cache 233, which virtual machine 33 read from storage. In response, the hypervisor 40 notifies virtual machine 33 of the virtual address to use for the cache (step 281). Then, hypervisor 40 increments cache user table 250 to reflect that virtual machine 33 is now a user of cache 233. (If the only other active user of this cache is cache keep-alive virtual machine 35, then the number of active users indicated in cache user table 250 for this cache 233 will be "2" as shown.) Then, virtual machine 33 resumes processing with the data in the cache 233 that existed when virtual machine 33 previously terminated (abnormally) (step 282).

FIG. 3 illustrates processing by a cache keep-alive virtual machine 35 within LPAR 30. At boot up and periodically thereafter, cache keep-alive virtual machine 35 accesses storage 26 to learn the names of any caches of any of the virtual machines within LPAR 30 (step 288). In the foregoing example, at some point cache keep-alive virtual machine 35 first learned the name of cache 233 used by productive virtual machine 33 (and any other caches used by any virtual machines within LPAR 30, as well). In response, the cache keep-alive virtual machine 35 made a request to hypervisor 40 to "attach" to cache 233 (and any other caches used by any virtual machines within LPAR 30, as well, to which virtual machine 35 is not yet attached) (step 290). The request to attach to each such cache includes the identity of the cache, such as the identity of cache 233. In response to this request, hypervisor 40 notified virtual machine 35 of the virtual address to use for each such cache (step 292). Also, hypervisor 40 incremented the number of users in the cache user table 250 for each such cache that virtual machine now requests attachment (step 294). In the example illustrated in FIG. 1, there are now two users of cache 233, i.e. virtual machine 33 and virtual machine 35. (This is the "2" entry in the first row of table 250 for cache 233 shown in FIG. 1.)

FIG. 3 also illustrates other programming within cache keep-alive virtual machine 35. If cache keep-alive virtual machine 35 subsequently terminates normally (for example, by log off) or abnormally (which is rare except upon failure of its guest operating system), then hypervisor 40 decrements the number of users in the cache user table for each cache to which the virtual machine is attached (step 296). Also, hypervisor 40 determines if there are no active users for any of these caches, and if there are no active users, hypervisor 40 deletes the respective cache (step 298).

FIG. 4 illustrates subsequent processing according to the present invention. At the beginning of the process of FIG. 4, virtual machine 33 is active, i.e. operating, as indicated by the steps of FIG. 2 (step 302). If virtual machine 33 terminates (on purpose or due to a failure of virtual machine 33 or the guest operating system 43) (decision 303, yes branch), virtual machine 33 will notify Oust prior to shut down) its hypervisor 40 that it is terminating and the nature of the termination, i.e. normal log off or due to failure (step 304). In the z/VM 5.1 hypervisor, the notification could be performed by the virtual machine executing a "disabled wait" instruction. If the virtual machine 33 is unable to notify its hypervisor 40 that it is terminating due to the nature of the failure, then hypervisor 40 will learn of the termination when the virtual machine subsequently attempts to reboot (and the hypervisor 40 is invoked in order to reboot the virtual machine (step 304). If hypervisor 40 detects a termination of the virtual machine (decision 305, no branch), then hypervisor 40 will decrement the user count for the virtual machine 33 in the cache user table 250 (step 308). Hypervisor 40 will preserve (i.e. not delete) cache 233 and its contents as long as there is one (active) virtual machine user of cache 233 (decision 310). If virtual machine 33 terminates, there will still be one active user of cache 233, i.e. virtual machine 35, so hypervisor 40 will preserve cache 233 and its contents (decision 310, yes branch and step 312). Also, hypervisor 40 will preserve the identity of this cache on disk 26 as well as the indication that this cache is assigned to virtual machine 33. Next, hypervisor 40 will perform other, known processing or "cleanup" associated with the termination of virtual machine 33 (step 320). This known processing comprises the deletion of the data structures which define this virtual machine's share of the real computer resources, including its private virtual memory.

It is not likely that virtual machine 35 will fail at the same time that virtual machine 33 fails, due to problems within virtual machine 35, because virtual machine 35 has little function to perform. Also, while a failure of hypervisor 40, LPAR 30 or physical computer 20 will result in loss of cache 233, such failures tend to occur much less frequently than a failure of a productive virtual machine. Consequently, when virtual machine 33 terminates abnormally and until virtual machine 33 reboots, it is likely that physical computer 20, LPAR 30, hypervisor 40 and virtual machine 25 are still active and the user count of cache 233 will be "one", so hypervisor 40 will retain cache 233 and its contents, as noted above in step 312. Nevertheless, if there is not a single user of cache 233 when virtual machine 33 fails/terminates abnormally (decision 310, no branch), then hypervisor 40 deletes cache 233 (step 324). The "deletion" of cache 233 may result from actual erasure of the cache contents, reassignment of the cache memory range to another virtual machine, or deletion of a page and segment table or other addressing table for the cache.

Refer again to decision 305, yes branch where virtual machine 33 terminates normally, i.e. by a normal log off. In such a case, hypervisor 40 will decrement the number of users of cache 233 (and any other caches for which virtual machine 33 was attached) (step 306). In step 306, hypervisor 40 will also determine if there are any remaining users of cache 233, and if not, then hypervisor 40 will erase cache 233. In either event, hypervisor 40 will perform normal termination processing of virtual machine 33, i.e. the deletion of the data structures which define this virtual machine's share of the real computer resources, including its private virtual memory (step 307).

Figure 5:
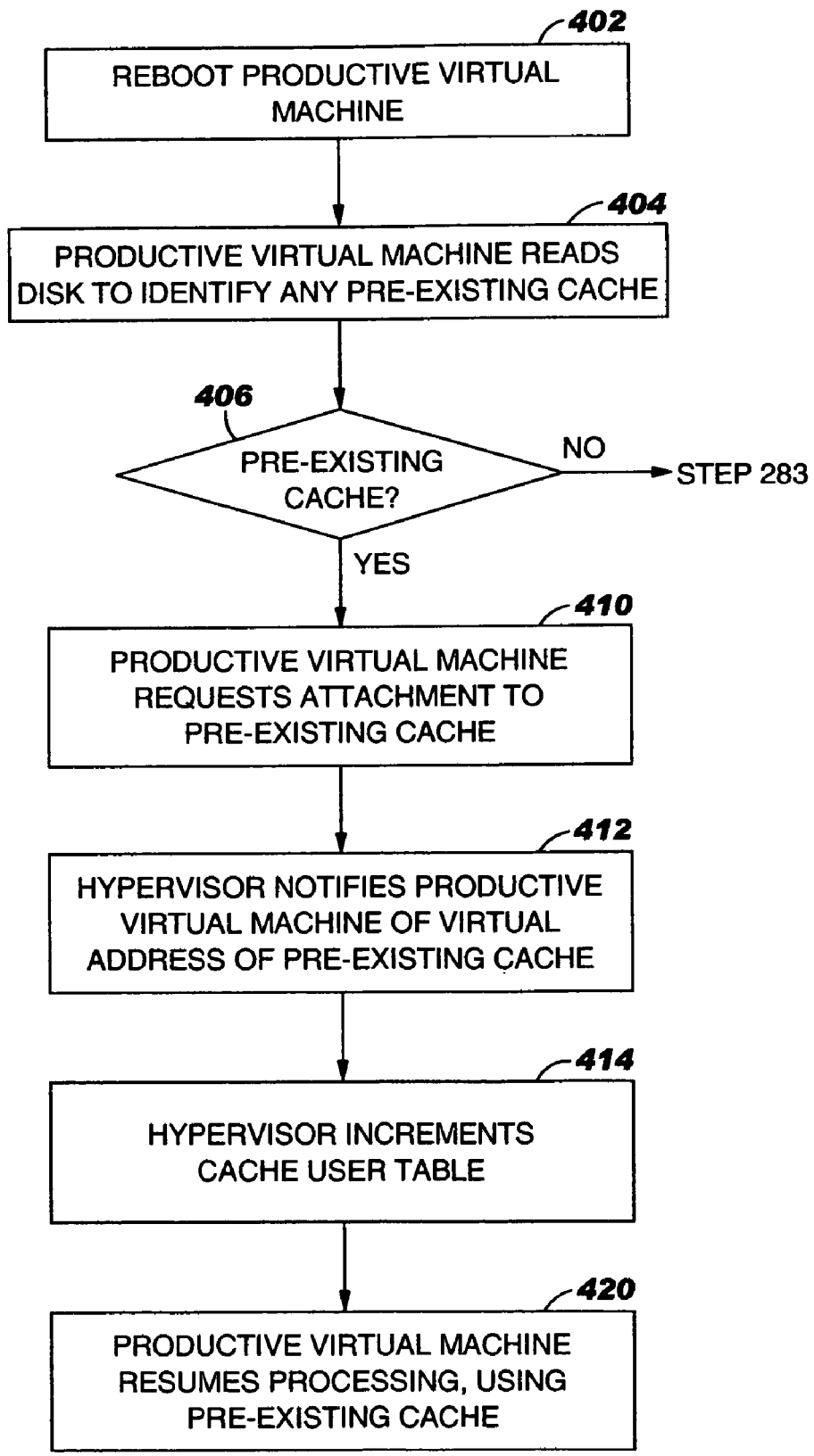
FIG. 5 is a flow chart illustrating processing by the productive virtual machine and hypervisor of FIG. 2 during rebooting of the virtual machine.

FIG. 5 illustrates subsequent restoration of virtual machine 33. In step 402, virtual machine 33 is rebooted. Then, virtual machine 33 accesses disk storage 26 to learn if it has a cache, and if so, the identity of its cache 233 (step 404). Under the foregoing conditions where virtual machine 33 terminated and cache 233 was preserved, then cache 233 will still contain the data and metadata stored by virtual machine 33 before virtual machine 33 terminated. So, assuming there is such a cache (decision 406, yes branch), after reboot in step 402, virtual machine 33 makes a request to hypervisor 40 to attach to cache 233 (step 410). The request specifies the identity of cache 233. In response, hypervisor 40 returns to virtual machine 33 the virtual address of the preexisting cache as stored in the page and segment or other such table to permit virtual machine 33 to access cache 233 (step 412). Also, hypervisor 40 increments the user count in table 250 for cache 233 to "2" (step 494); it was decremented to "1" when virtual machine 33 terminated abnormally. Then, virtual machine 33 can resume processing, using the data and metadata in cache 233, where it left off when virtual machine 33 terminated abnormally (step 420).

Refer again to decision 406, no branch, where there is no retained cache for virtual machine 33. In such a case, virtual machine 33 will proceed to step 283 to request to attach to a new, empty cache. In response, hypervisor 40 will build a temporary page and segment or other such table for the new cache (step 284), and then continue with steps 285-294, as described above.

Similar processing will occur for each of the other productive virtual machines 34, 36 and 37, and cache keep-alive virtual machine 38 when virtual machines 34, 36 and 37 are initiated (FIG. 2), when they terminate (FIG. 4), and when they recover (FIG. 5). In LPAR 31, the virtual machines 36 and 37 have respective cache memories (not shown) and a cache user table (not shown) in hypervisor 41's shared memory (not shown). When virtual machines 36 and 37 are active, the user count for their respective caches are each "two" because cache keep-alive virtual machine 38 is also a user of each of these caches. If virtual machine 36 terminates, the hypervisor 41 decrements the user count for its cache to "one" but retains the cache and its contents for when virtual machine 36 is rebooted. Likewise, if virtual machine 37 terminates, the hypervisor 41 decrements the user count for its cache to "one" but retains the cache and its contents for when virtual machine 37 is rebooted.

Figure 6:
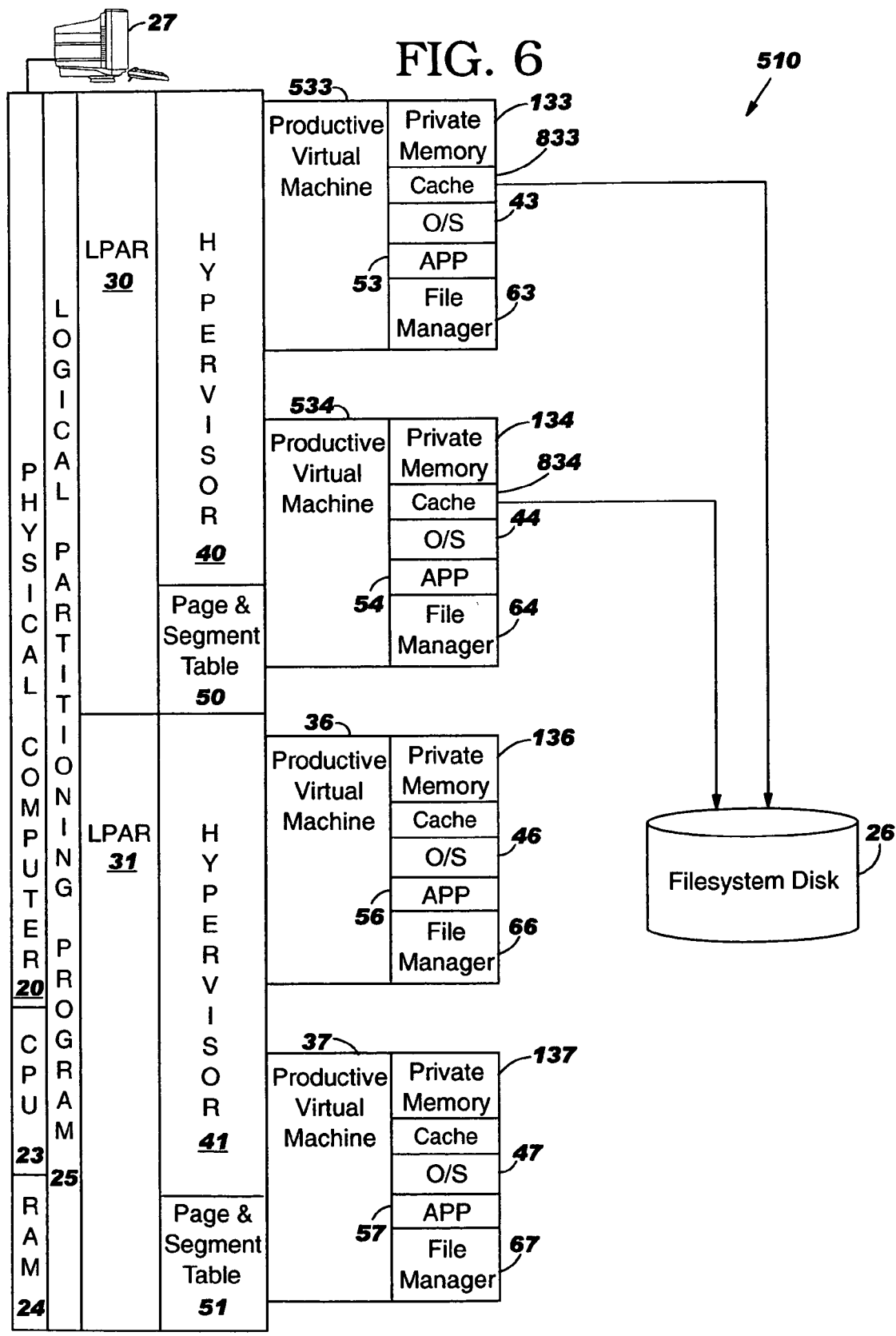
FIG. 6 is a block diagram of another real computer with two logical partitions, multiple virtual machines in each logical partition, and a hypervisor in each logical partition, according to another embodiment of the present invention.
Figure 7:
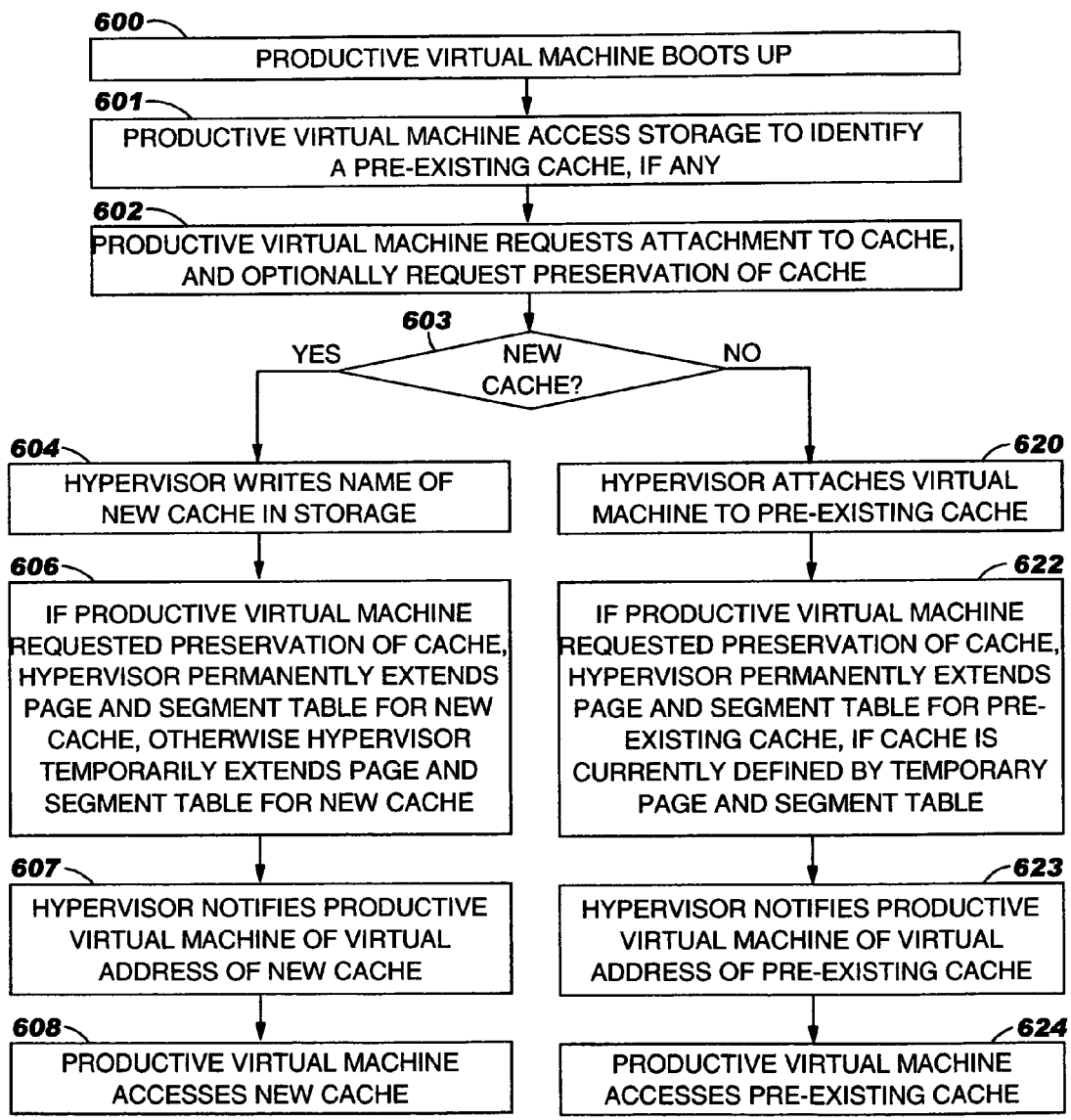
FIG. 7 is a flow chart of processing by a virtual machine and a hypervisor within the computer system of FIG. 6, during initialization and set up or rebooting of the virtual machine.
Figure 8:
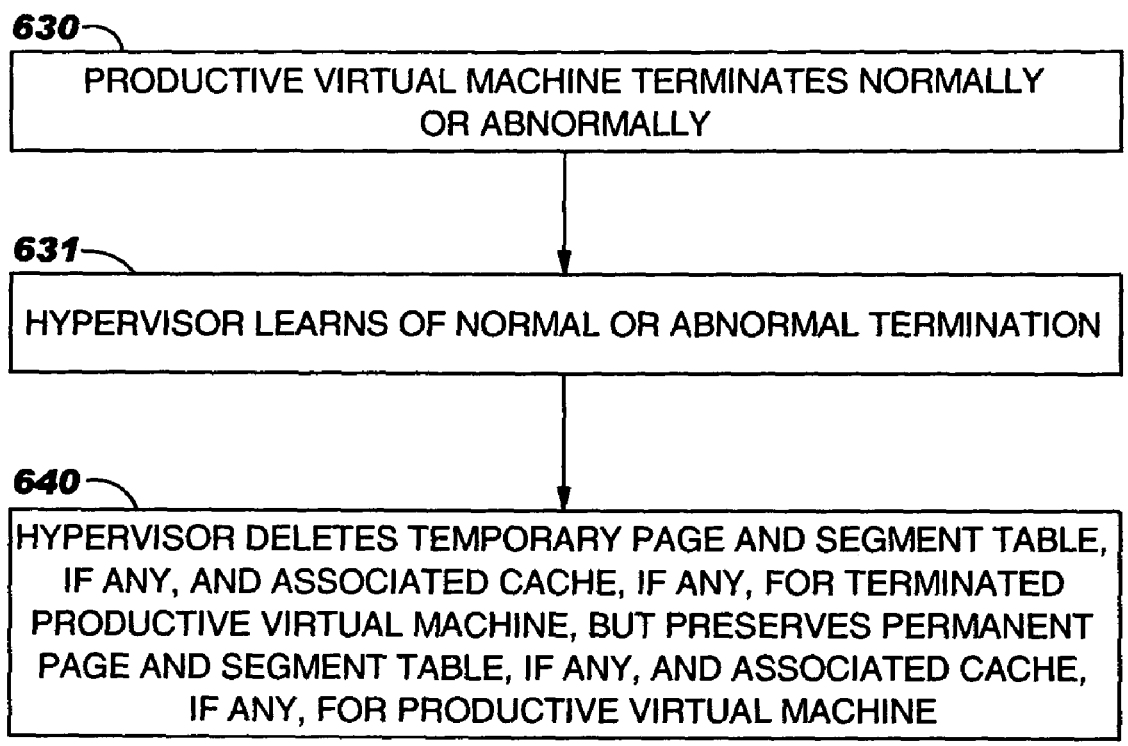
FIG. 8 is a flow chart illustrating processing by the virtual machine and hypervisor of FIG. 7 during termination of the virtual machine.

FIGS. 6, 7 and 8 illustrate another embodiment of the present invention generally designated 510, which is similar to the embodiment of FIGS. 1, 2, 4 and 5 except for the following: As illustrated in FIG. 6, system 510 does not include any cache keep-alive virtual machines. The cache of each productive virtual machine in system 510 (for example, cache 833 for productive virtual machine 533 and cache 834 for productive virtual machine 534) can be stored either in the respective virtual machine's private memory or in the hypervisor's shared memory; in the illustrated embodiment, each cache is stored in the respective virtual machine's private memory. There is no cache user table in system 510 when the cache is stored in the virtual machine's private memory. When a productive virtual machine in LPAR 30 requests attachment to a new cache, hypervisor 540 makes a more permanent extension to the page and segment or other such table to encompass this new cache; this results in the cache being preserved upon abnormal termination of the virtual machine. Hypervisor 540 includes additional function compared to that of hypervisor 40 as illustrated in FIGS. 6 and 7 and described below, to preserve a cache of a virtual machine when the virtual machine terminates.

In system 510, when productive virtual machine 533 boots up (step 600 of FIG. 7), it accesses storage 26 to determine if virtual machine 533 already has a preexisting cache (step 601 of FIG. 7). Then, virtual machine 533 makes a request to hypervisor 540 to attach virtual machine 533 to its preexisting cache, if any, or otherwise to a new cache (step 602). Virtual machine 533 may include in the request an indication that the cache should be preserved in the event that virtual machine 533 terminates (step 602); otherwise, the cache will be deleted in the event that virtual machine 533 terminates. The request also specifies the identity of the desired cache, if there is a preexisting cache. In response to the attachment request, hypervisor 540 determines if the request is to attach to a new cache or a preexisting cache (decision 603). If the cache is new (decision 603, yes branch), then hypervisor 540 determines and writes the identity of the new cache in storage 26 (step 604). If virtual machine 533 requested in step 602 to preserve the cache in the event of termination of virtual machine 533, then hypervisor 540 "permanently" extends its page and segment or other such table 550 to define and encompass the new cache 833 for virtual machine 533 (step 606). The page and segment table correlates a virtual address to the cache. If the new cache is referenced by a permanent page and segment or other such table, hypervisor 540 will not delete the new cache when virtual machine 533 terminates abnormally. Alternately, in step 606, if virtual machine 533 did not request to preserve the cache in the event of termination of virtual machine 533, then hypervisor 540 "temporarily" extends its page and segment or other such table 550 to define and encompass the new cache for virtual machine 533. If the new cache is referenced by a temporary page and segment or other such table, hypervisor 540 will delete the new cache when virtual machine 533 terminates. Next, hypervisor 550 notifies virtual machine 533 of the virtual address of the cache (step 607). Then, virtual machine 533 uses the new cache to store data and metadata read from storage (step 608).

Refer again to decision 603, no branch, where virtual machine 533 requested attachment to a preexisting cache. In such a case, hypervisor 540 attaches virtual machine 533 to the preexisting cache identified in the attachment request (step 620). If virtual machine 533 requested in step 602 that the cache be preserved, then hypervisor 540 will create a permanent extension of the page and segment or other such table, if there is currently only a temporary extension of the page and segment or other such table for the preexisting cache and delete the temporary extension (step 622). If there is already a permanent extension of the page and segment or other such table for the preexisting cache, then hypervisor 540 leaves that intact. Then, hypervisor 550 notifies virtual machine 533 of the virtual address of the cache (step 623). Then, virtual machine 533 uses the new cache to store data and metadata read from storage (step 624).

FIG. 8 illustrates processing by productive virtual machine 533 and hypervisor 540 when virtual machine 533 terminates (step 630). Hypervisor 540 learns of the termination either through execution of a disabled wait instruction or the reboot of the virtual machine (step 631). Hypervisor 540 will delete a temporary page and segment or other such table, if one exists for this terminated virtual machine's cache, and the associated cache (step 640). However, hypervisor 540 will not delete a permanent page and segment or other such table, if one exists for this terminated virtual machine's cache, or the associated cache (step 640). This is because the termination might have prevented the virtual machine from fully processing or flushing back to storage the data and metadata in the cache, and the virtual machine may need this data and metadata if it resumes operation.

Two other embodiments (not shown) of the present invention are similar to systems 110 or 510, respectively, except there is no logical partitioning program 25 and no LPARs 30 or 31. There is a single hypervisor such as hypervisor 40 or 540, and the hypervisor forms all of the virtual machines from a share of all of the real resources of real computer 20. The function of the virtual machines and other components of these two other embodiments of the present invention are similar to those of the virtual machines and other components of systems 110 and 510, respectively.

Figure 9:
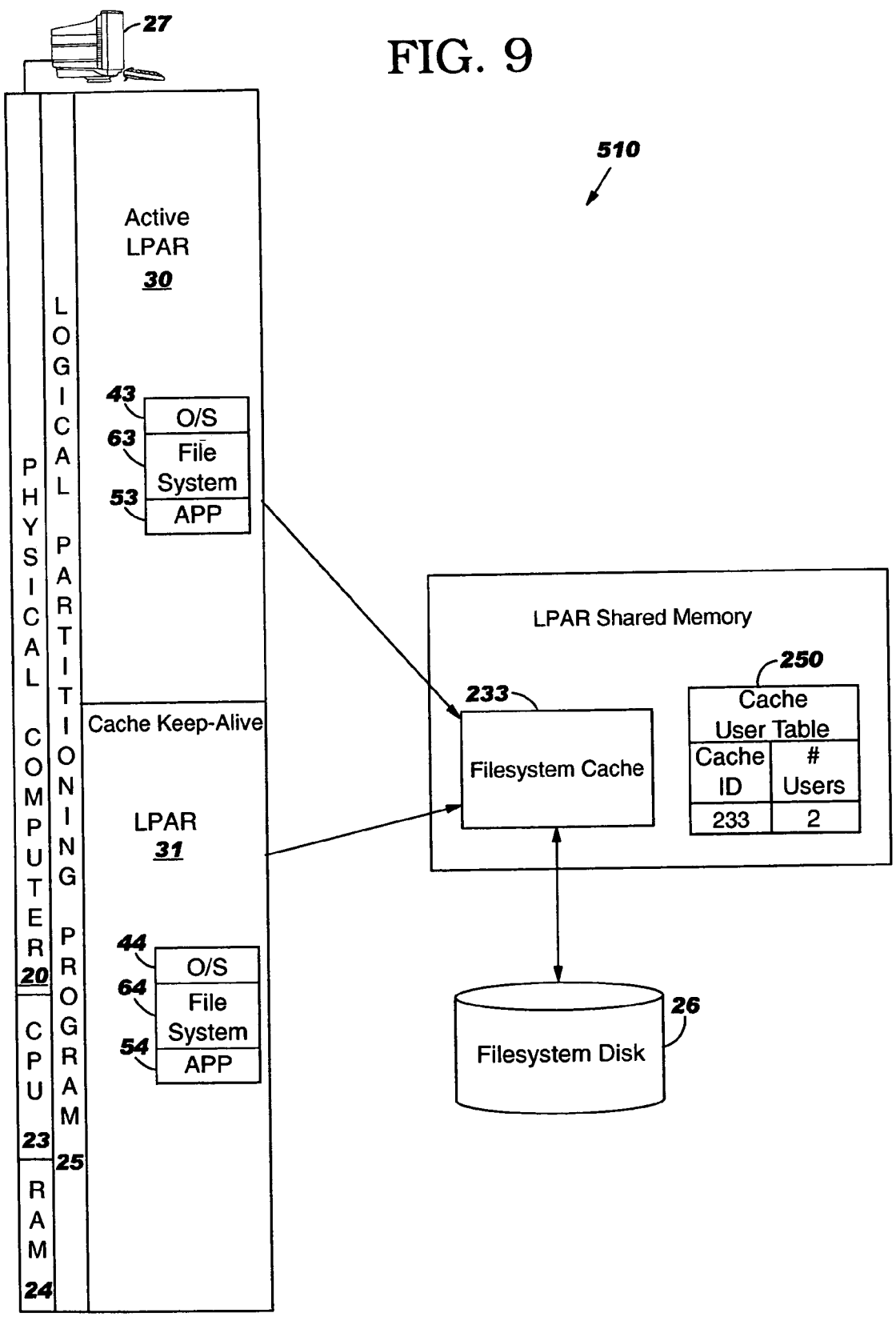
FIG. 9 is a block diagram of a real computer with two logical partitions, according to another embodiment of the present invention.

FIG. 9 illustrates system 810 in accordance with another embodiment of the present invention. System 810 is similar to system 110 insofar as physical computer 20, processor(s) 23, RAM 24, console 27, logical partitioning program 25, LPAR 30, operating system 43, file system 63, application 53, cache 233, cache user table 250 and disk 26. System 810 is also similar to system 110 insofar as operating system 44, file system 64, application 54 and LPAR 31, although the role of LPAR 31 is to keep cache 233 alive in the event that operating system 43 or LPAR 30 terminates. As illustrated by FIGS. 10-13, the programming steps for system 810 are similar to those of system 110, except there is no hypervisor.

Figure 10:
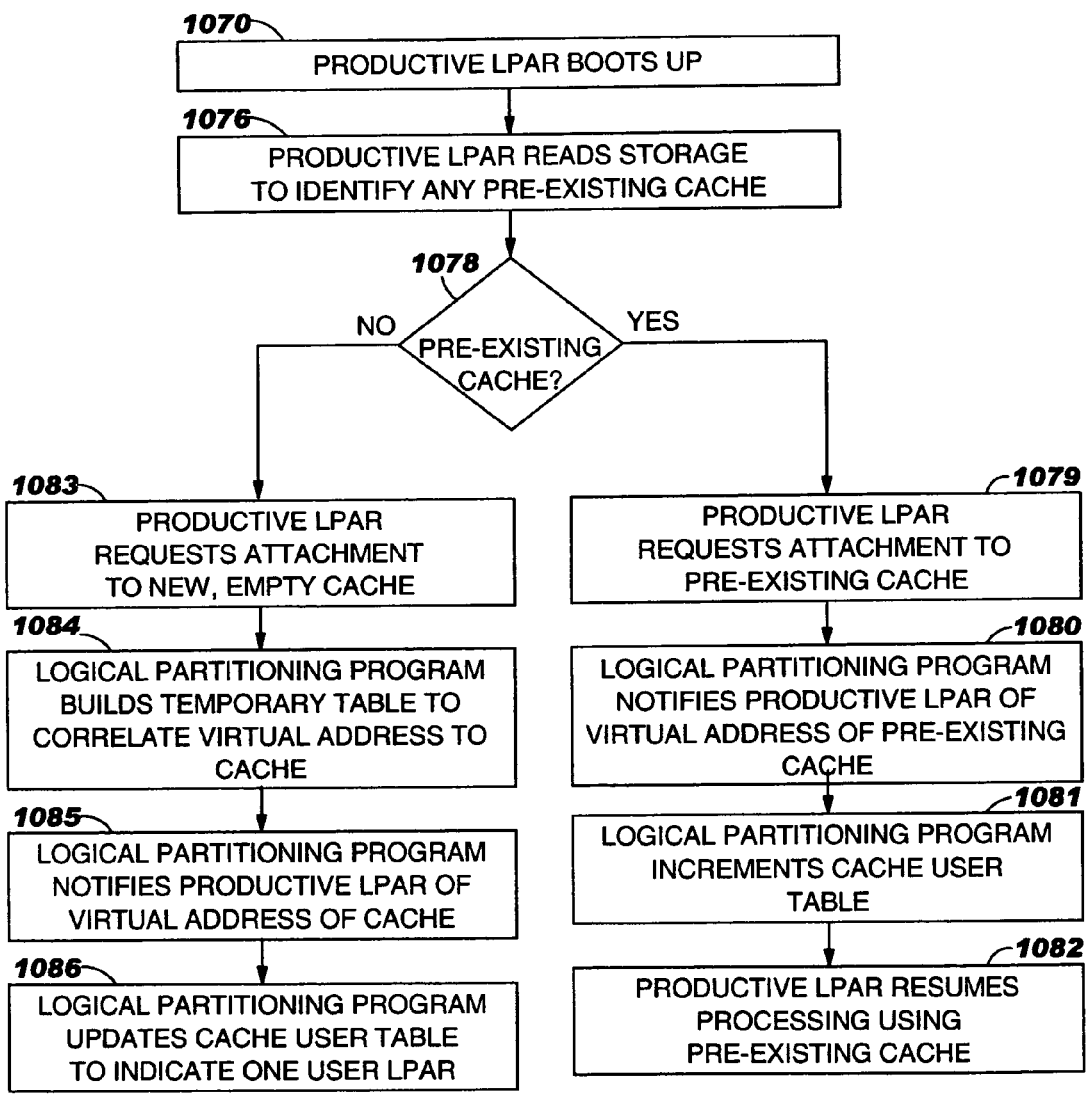
FIG. 10 is a flow chart of processing by a productive LPAR and a logical partitioning program within the computer system of FIG. 9, during initialization and set up of the LPAR.

FIG. 10 illustrates initialization and setup of each productive LPAR 30. When LPAR 30 begins operation (step 1070 of FIG. 10), it reads storage 26 to determine if a cache already exists for the LPAR (step 1076 of FIG. 10). If there is no preexisting cache (decision 1078, no branch), then the LPAR 30 requests to attach to a new, empty, cache (step 1083). In response, the logical partitioning program 25 builds a temporary "page and segment" or other such table 50 to address the new cache, i.e. correlate a virtual address of the cache to be supplied by the LPAR to the corresponding real address/segment of memory where the cache resides (step 1084). Then, the logical partitioning program 25 notifies LPAR 30 of the virtual address to use to access the new cache (step 1085). This permits LPAR 30 to access (i.e. read from and write to) the new cache 233 by appropriate virtual address. Because the page and segment table for this cache is temporary, the logical partitioning program 25 is programmed to delete the cache whenever there are no (active) users of the cache. Logical partitioning program 25 also records in a cache user table 250 that there is currently one LPAR user of cache 233 (step 1086).

Refer again to decision 1078, yes branch, where there was a preexisting cache. In such a case, LPAR 30 makes a request to logical partitioning program 25 to "attach" to this cache (step 1079). In this case, the request includes the identity of cache 233, which LPAR 30 read from storage. In response, the logical partitioning program 25 notifies LPAR 30 of the virtual address to use for the cache (step 1080). Then, logical partitioning program 25 increments cache user table 250 to reflect that LPAR 30 is now a user of cache 233 (step 1081). (If the only other active user of this cache is cache keep-alive LPAR 31, then the number of active users indicated in cache user table 250 for this cache 233 will be "2" as shown.) Then, LPAR 30 resumes processing with the data in the cache 233 that existed when LPAR 30 previously terminated (abnormally) (step 1082).

FIG. 11 illustrates processing by a cache keep-alive LPAR 31. At boot up and periodically thereafter, cache keep-alive LPAR 31 accesses storage 26 to learn the names of any caches of any of the LPARs provided by logical partitioning program 25 (step 1188). In the foregoing example, at some point cache keep-alive LPAR 31 first learned the name of cache 233 used by productive LPAR 30 (and any other caches used by any LPARs provided by logical partitioning program 25, as well). In response, the cache keep-alive LPAR 31 made a request to logical partitioning program 25 to "attach" to cache 233 (and any other caches used by any LPARs provided by logical partitioning program 25, as well to which LPAR 31 is not yet attached) (step 1190). The request to attach to each such cache includes the identity of the cache, such as the identity of cache 233. In response to this request, logical partitioning program 25 notified LPAR 31 of the virtual address to use for each such cache (step 1192). Also, logical partitioning program 25 incremented the number of users in the cache user table 250 for each such cache that LPAR now requests attachment (step 1194). In the example illustrated in FIG. 9, there are now two users of cache 233, i.e. LPAR 30 and LPAR 31. (This is the "2" entry in the first row of table 250 for cache 233 shown in FIG. 9.)

FIG. 11 also illustrates other programming within cache keep-alive LPAR 31. If cache keep-alive LPAR 31 subsequently terminates normally (for example, by log off) or abnormally (which is rare except upon failure of its guest operating system), then logical partitioning program 25 decrements the number of users in the cache user table for each cache to which LPAR 31 is attached (step 1196). Also, logical partitioning program 25 determines if there are no active users for any of these caches, and if there are no active users, logical partitioning program 25 deletes the respective cache (step 1198).

FIG. 12 illustrates subsequent processing according to the present invention. At the beginning of the process of FIG. 12, LPAR 30 is active, i.e. operating, as indicated by the steps of FIG. 10 (step 1002). If LPAR 30 terminates (on purpose or due to a failure of LPAR 30 or the operating system 43) (decision 1203, yes branch), LPAR 30 will notify (Oust prior to shut down) logical partitioning program 25 that it is terminating and the nature of the termination, i.e. normal log off or due to failure (step 1204). The notification could be performed by the LPAR executing a "disabled wait" instruction. If LPAR 30 is unable to notify the logical partitioning program 25 that it is terminating due to the nature of the failure, then logical partitioning program 25 will learn of the termination when the virtual machine subsequently attempts to reboot (and the logical partitioning program 25 is invoked in order to reboot the LPAR (step 1204). If logical partitioning program 25 detects a termination of the LPAR (decision 1205, no branch), then logical partitioning program 25 will decrement the user count for the LPAR 31 in the cache user table 250 (step 308). Logical partitioning program 25 will preserve (i.e. not delete) cache 233 and its contents as long as there is one (active) LPAR user of cache 233 (decision 1210). If LPAR 30 terminates, there will still be one active user of cache 233, i.e. LPAR 31, so logical partitioning program 25 will preserve cache 233 and its contents (decision 1210, yes branch and step 1212). Also, logical partitioning program 25 will preserve the identity of this cache on disk 26 as well as the indication that this cache is assigned to LPAR 30. Next, logical partitioning program 25 will perform other, known processing or "cleanup" associated with the termination of LPAR 30 (step 1220). This known processing comprises the deletion of the data structures which define this LPAR's share of the real computer resources, including its private virtual memory.

FIG. 13 illustrates subsequent restoration of LPAR 30. In step 1302, LPAR 30 is rebooted. Then, LPAR 30 accesses disk storage 26 to learn if it has a cache, and if so, the identity of its cache 233 (step 1304). Under the foregoing conditions where LPAR 30 terminated and cache 233 was preserved, then cache 233 will still contain the data and metadata stored by LPAR 30 before LPAR 30 terminated. So, assuming there is such a cache (decision 1306, yes branch), after reboot in step 402, LPAR 30 makes a request to logical partitioning program 25 to attach to cache 233 (step 1310). The request specifies the identity of cache 233. In response, logical partitioning program 25 returns to LPAR 30 the virtual address of the preexisting cache as stored in the page and segment or other such table to permit LPAR 30 to access cache 233 (step 1312). Also, logical partitioning program 25 increments the user count in table 250 for cache 233 to "2" (step 1314); it was decremented to "1" when LPAR 30 terminated abnormally. Then, LPAR 30 can resume processing, using the data and metadata in cache 233, where it left off when LPAR 30 terminated abnormally (step 1320).

Refer again to decision 1306, no branch, where there is no retained cache for LPAR 30. In such a case, LPAR 30 will proceed to step 1083 to request to attach to a new, empty cache. In response, logical partitioning program 25 will build a temporary page and segment or other such table for the new cache (step 1084), and then continue with steps 1085-1096, as described above.

Based on the foregoing, computer systems, methods and programs embodying the present invention have been disclosed. However, numerous modifications and substitutions can be made without deviating from the scope of the present invention. For example, instead of creating cache keep-alive virtual machines in system 110, the hypervisor for each productive virtual machine can automatically increment the number of users by an additional count in the cache user table 250 for the cache of a productive virtual machine, when the productive virtual machine requests attachment to the cache. Consequently, if the productive virtual machine terminates and the hypervisor 40 decrements the number of users in the cache user table 250, there will still be one user indicated in the table, and the hypervisor 40 will not delete the cache. Therefore, the present invention has been disclosed by way of illustration and not limitation, and reference should be made to the following claims to determine the scope of the present invention.

What is claimed is:

1. A method for managing virtual machines, said method comprising the steps of:
   a first virtual machine being operational and requesting to attach to a cache, and in response, attaching said first virtual machine to said cache, and recording that said first virtual machine is assigned to said cache;
   a second virtual machine being operational and requesting to attach to said cache, and in response, attaching said second virtual machine to said cache, and recording that said second virtual machine is assigned to said cache;
   subsequently, said first virtual machine ceasing to operate due to failure of said first virtual machine while said second virtual machine is operational, and in response, determining that a virtual machine is operational and attached to said cache, and in response, preserving said cache; and
   subsequently, resuming operation of said first virtual machine, and in response, determining from said record that said first virtual machine is assigned to said cache and reattaching said first virtual machine to said cache.

2. A method as set forth in claim 1 further comprising the prior steps of a hypervisor defining resources for said first and second virtual machines from a same real computer; and wherein the step of attaching said first virtual machine to said cache is performed by said hypervisor, the step of attaching said second virtual machine to said cache is performed by said hypervisor, and the step of reattaching said first virtual machine to said cache is performed by said hypervisor.

3. A method as set forth in claim 1 further comprising the steps of:
   said second virtual machine making a request to a hypervisor of said first and second virtual machines to preserve said cache even if there is no operational virtual machine which is attached to said cache, and in response, said hypervisor making a record that said cache should be preserved even if there is no operational virtual machine which is attached to said cache, and subsequently, said first and second virtual machines terminating and there are no operational virtual machines attached to said cache, and in response, preserving said cache based on said record that said cache should be preserved even if there is no operational virtual machine attached to said cache, and subsequently, said second virtual machine resuming operation, and in response, reattaching said second virtual machine to said cache.

4. A method as set forth in claim 1 wherein:
   a hypervisor defined said second virtual machine to preserve said cache in the event said first virtual machine ceases to operate; and
   a program within said second virtual machine repeatedly queries said hypervisor for identities of caches used by said first virtual machine and other virtual machines in said real computer, and attaches to said caches used by said first virtual machine and other virtual machines in said real computer for a sole purpose of preserving said caches used by said first virtual machine and other virtual machines in said real computer in the event said first virtual machine and other virtual machines in said real computer terminate.

5. A method as set forth in claim 1 wherein said first virtual machine terminated without normal shut down of said first virtual machine.

6. A computer system for managing a cache, said system comprising:
   a processor;
   a hypervisor executing on said processor to define first and second virtual machines, said first and second virtual machines sharing said processor;
   means within said first virtual machine for requesting attachment to a cache, and means within said hypervisor, responsive to said request by said first virtual machine, for attaching said first virtual machine to said cache and recording that said first virtual machine is assigned to said cache;
   means within said second virtual machine for requesting attachment to said cache, and means within said hypervisor, responsive to said request by said second virtual machine, for attaching said second virtual machine to said cache and recording that said second virtual machine is assigned to said cache;
   means within said hypervisor, responsive to subsequent cessation of operation of said first virtual machine while said second virtual machine is operational, for determining that at least one virtual machine is operational and attached to said cache, and in response, preserving said cache; and
   means within said hypervisor, responsive to subsequent resumption of operation of said first virtual machine, for determining from said record that said first virtual machine is assigned to said cache and reattaching said first virtual machine to said cache.

7. A system as set forth in claim 6 further comprising:
means within said second virtual machine for making a request to said hypervisor to preserve said cache even if there is no operational virtual machine which is attached to said cache;
means within said hypervisor, responsive to the request to preserve said cache, for making a record that said cache should be preserved even if there is no operational virtual machine which is attached to said cache;
means, within said hypervisor, responsive to subsequent termination of said first and second virtual machines and any other virtual machines attached to said cache, for preserving said cache; and
means, within said hypervisor, responsive to subsequent resumption of said second virtual machine, for reattaching said second virtual machine to said cache.

8. A system as set forth in claim 6 wherein said hypervisor defined said second virtual machine to preserve said cache in the event said first virtual machine ceases to operate, and further comprising a program within said second virtual machine to repeatedly query said hypervisor for identification of caches used by said first virtual machine and other virtual machines in said real computer, and attach said second virtual machine to said caches used by said first virtual machine and other virtual machines in said real computer for a sole purpose of preserving said caches used by said first virtual machine and other virtual machines in said real computer in the event said first virtual machine and other virtual machines in said real computer terminate.

9. A system as set forth in claim 6 wherein said first virtual machine terminated without normal shut down of said first virtual machine.

10. A method for managing virtual machines, said method comprising the steps of:
a first virtual machine being operational and making a request to a hypervisor to attach to a first cache and preserve said first cache in case said first virtual machine terminates, and in response, said hypervisor defining a first table which correlates first virtual addresses to said first cache and recording that said first table should be preserved upon termination of said first virtual machine, said first virtual machine using said first virtual addresses to access said first cache, and subsequently, said first virtual machine terminating due to failure of said first virtual machine and said first cache being preserved, and subsequently, said first virtual machine resuming operation, and in response, reattaching said first virtual machine to said first cache; and
a second virtual machine being operational and making a request to said hypervisor to attach to a second cache but not preserve said second cache in case said second virtual machine terminates, and in response, said hypervisor defining a second table which correlates second virtual addresses to said second cache and recording that said second table should not be preserved upon termination of said second virtual machine, said second virtual machine using said second virtual addresses to access said second cache, and subsequently, said second virtual machine terminating, and in response, said second table not being preserved, and subsequently, said second virtual machine resuming operation and attaching to a third cache, said second cache not being available to said second virtual machine upon the resumption of operation of said second virtual machine; and wherein said hypervisor defines computer resources for said first and second virtual machines in a same real computer.

* * * * *